United States Patent [19]

Beeding

[11] Patent Number: 4,723,766
[45] Date of Patent: Feb. 9, 1988

[54] PROGRAMMABLE VACUUM POD SYSTEM FOR CHUCKING WORKPIECES

[75] Inventor: Jack D. Beeding, Rockford, Ill.

[73] Assignee: Ekstrom, Carlson & Co., Rockford, Ill.

[21] Appl. No.: 913,980

[22] Filed: Oct. 1, 1986

[51] Int. Cl.$^4$ .............................................. B25B 11/00
[52] U.S. Cl. ...................................... 269/21; 269/266
[58] Field of Search ................... 269/21, 266; 51/235; 279/3

[56] References Cited

U.S. PATENT DOCUMENTS

| | | | |
|---|---|---|---|
| 2,680,994 | 6/1954 | Wood | 90/59 |
| 3,272,611 | 9/1966 | Jorgensen | 65/152 |
| 3,460,822 | 8/1969 | Link | 269/21 |
| 3,484,093 | 12/1969 | Mermelstein | 269/21 |
| 3,596,429 | 7/1968 | Vogt | 269/21 |
| 3,729,206 | 4/1973 | Cachon et al. | 279/3 |
| 3,838,865 | 10/1974 | Roberts et al. | 279/3 |
| 3,957,263 | 5/1976 | Christl | 271/102 |
| 4,088,312 | 5/1978 | Frosch et al. | 269/21 |
| 4,391,511 | 7/1983 | Akiyama et al. | 269/21 |

FOREIGN PATENT DOCUMENTS

DE33169-80A1 11/1984 Fed. Rep. of Germany .

Primary Examiner—Frederick R. Schmidt
Assistant Examiner—Judy J. Hartman
Attorney, Agent, or Firm—Leydig, Voit & Mayer

[57] ABSTRACT

An improved chucking system for workpieces in machine tools has a series of vacuum pods selectively activated for supporting the workpiece in an elevated position relative to the machine tool work table to assure a safe degree of clearance for a cutting tool projecting through the workpiece. The support pods form a grid-like array about the work table in a flush-fit relation to the surface of the work table. Pods have pressure-regulated (air and vacuum) configuration that allows selected pods may be raised above the table surface to support the workpiece and retains the latter in position by applying vacuum to its undersurface. A selected subset of pods to be active and raised while the machining of a particular workpiece is being carried out, without offering any interference to the operation of the cutting tool.

9 Claims, 9 Drawing Figures

PRIOR ART

TO VACUUM SOURCE

TO PRESSURIZED AIR SOURCE

TO VACUUM SOURCE

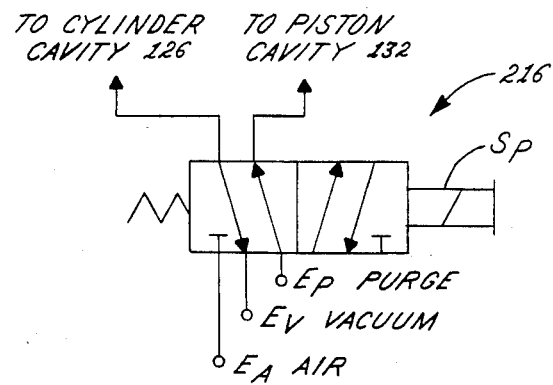
FIG. 7b
FIG. 7a
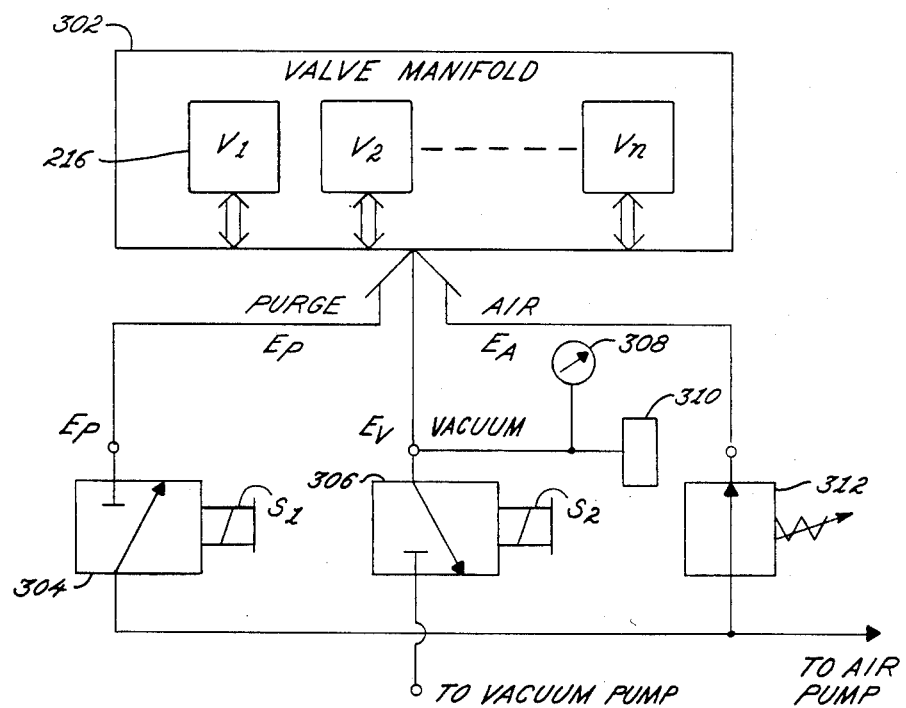

PROGRAMMABLE VACUUM POD SYSTEM FOR CHUCKING WORKPIECES

FIELD OF THE INVENTION

The present invention generally relates to chucking systems for workpieces in machine tools. More particularly, this invention relates to vacuum chucking of workpieces on the support bed of a machine tool without any separate support fixtures.

BACKGROUND OF THE INVENTION

In a wide variety of machining operations, such as those performed by milling, routing or drilling machines, it is often desirable and necessary to rigidly support a generally flat workpiece in an elevated fashion above the machine tool bed or work table to allow the tool to penetrate the workpiece without interferring with the machine bed. Examples are numerous and include those where a workpiece has to be milled along its edges by a milling cutter which moves totally around its periphery, or where holes need to be drilled completely through a workpiece or where large openings have to be formed by plunging a routing cutter completely through the workpiece and then moving it through a selected closed path. If the workpiece were positioned directly on the machine bed when performing operations such as these, the tool would inevitably engage the bed, damaging the tool, the bed or both. With the workpiece elevated, a safe degree of clearance is provided between the cutting device and the machine tool bed even when the cutting device projects completely through the workpiece.

In the past, the necessary clearance has been provided by the use of a "spoil-plate" interposed between the machine tool bed and the workpiece. Such an arrangement is diagrammatically illustrated in FIG. 1 where a workpiece 10 is on a spoil-plate 12, which in turn is positioned on the machine bed or work table 14. The work table 14 itself is constructed with vacuum holes 16 which are connected on one end to a vacuum source through an on/off valve 18. The vacuum holes 16 communicate with the top surface of the work table 14 so that the applied vacuum pulls the spoil-plate into tight engagement with the work table. The spoil-plate 12 is specially designed with an undercut recess 20 and with vertical holes 22 communicating upwardly to a top recess 23. In effect, the holes 22 transfer any applied vacuum to the undersurface of the workpiece so that it is held tightly against the spoil-plate, which in turn is held by the vacuum to the work table. The cutter 24 when projecting through the workpiece will drill into or route through the spoil-plate material but will not, of course, touch or damage the table 14. FIG. 1 is somewhat oversimplified; in practice recess 20 and its through holes 22 must be designed to provide adequate and adequately distributed vacuum to hold the workpiece, while at the same time being coordinated to the machining program to avoid interferring with the vacuum hold down.

This type of prior art technique has a number of disadvantages. For instance, the through holes 22, the channel 20 and the upper recess have to be carefully and accurately located so that they are not in regions through which a cutting tool 24 will pass when the workpiece is machined with the cutter projecting completely through the workpiece; otherwise there is the danger that the cutting tool 24 will machine through the spoil-plate's vacuum system, effectively destroying it and causing undesirable workpiece displacement. Hence, the spoil-plate has to be made as a separate fixture especially designed and tailored to the particular workpiece and the machining program for it.

There hence exists a need for a more efficient and convenient arrangement for the vacuum chucking of workpieces, which is not subject to the above problems faced by the prior art.

SUMMARY OF THE INVENTION

In view of the foregoing, it is an aim of the present invention to provide an improved chucking system for workpieces in machine tools whereby the workpiece is securely held in an elevated position relative to the machine tool work table without the use of a spoil-plate.

According to an important aspect of this invention, it is an object to accomplish the above aim in a manner which provides maximum flexibility in accommodating numerous types of workpieces and machining programs.

A further object is to provide such a chucking system which permits a variety of machining patterns and operations to be conveniently performed on workpieces supported by the system without damaging the cutting tool, the machine work table, or the chucking system.

A related object of this invention is to provide a workpiece chucking system with the above characteristics which is particularly adaptable to be programmably controlled in such a way that the entire process of supporting workpieces in a non-interfering manner with the cutting tool while subjecting the workpiece to a variety of machining patterns and operations, can be rendered automatic.

These and other objects of this invention are realized by providing a support system which includes a spaced array of vacuum pods supported on the work table of the machine tool. The vacuum pods have an upper support surface which, in the normally inactivated position, is substantially flush with the work table. In the activated position the support surface is raised from the work table to provide a gap for receiving the tip of the tool. Each pod, in the preferred embodiment, has its own activator means. Means are provided to activate and thereby extend a selected subset of the array of vacuum pods. Which pods are extended depends not only on the size and shape of the workpiece, but also on the machining program, so that no pods are activated in areas through which the tool is to pass. A vacuum source is coupled to each of the activated pods to securely hold the workpiece in place.

The selective application of pressurized air and vacuum to the support pods can be controlled manually, but preferably is controlled by action of any suitable numerical control (NC) unit conventionally used to perform programmed machining of the workpiece. The NC unit is preprogrammed for a given workpiece on the basis of a known particular combination of the pods over which the workpiece will lie when positioned at a defined region of the machine tool bed. More specifically, the NC unit is provided with a part program which includes a designation of a selected subset of pods which will be active and raised while the machining of a particular workpiece or series of workpieces is being carried out. The designated pods are those which will be active in locations which will firmly hold the workpiece but which will not interfere with the cutting tool as it goes through the necessary motions and paths in performing the programmed machining upon the workpiece. This part program is used by the NC unit to send energizing signals to those particular valves associated with the program-designated subset of vacuum pods. Consequently, each selected pod has its piston arrangement pressurized so that it is raised above the machine bed surface. Energizing signals are also sent to valves associated with the designated pods in order to generate a vacuum following the placement of a workpiece upon the raised pods.

When a workpiece is to be chucked in place, it is laid over a given region of the machine work table and the designated subset of support pods underlying the workpiece are enabled so that they rise and lift the workpiece above the table surface; a vacuum applied through the activated pods firmly holds the workpiece in the desired position. By providing selective and programmable control over which pods underlying a workpiece are activated or deactivated, the present invention permits the cutting tool to perform the desired machining operations on any of a wide variety of workpieces without damaging the cutting tool, the machine table, or the pods—and without requiring the making of a special spoil-plate or fixture for each particular workpiece. For example, when a workpiece is to be edged milled, all of the pods underlying the workpiece can be activated for firm, planar support. When it is desired to perform internal work, such as boring a cutout or routing out an aperture, those pods underlying the cutout will not be activated and raised. In the machine tool part programming, it is entirely feasible to leave pods activated and to drop them only as the tool approaches. The flexibility will thus be apparent. In any event, once machining of the workpiece is completed, the activated pods are deactivated and the vacuum supply terminated so that the workpiece can be removed.

Other objects, characteristics and advantages of the present invention will be apparent from the following detailed description when taken in conjunction with the accompanying drawings.

BRIEF DESCRIPTION OF THE DRAWINGS

FIGS. 7a and 7b are schematic diagrams illustrating the connections to the various valves that regulate the functioning of the support pods.

DESCRIPTION OF THE PREFERRED EMBODIMENTS

While the invention will be described in connection with certain preferred embodiments, it will be understood that it is not intended to limit the invention to those particular embodiments. On the contrary, it is intended to cover all alternatives, modifications and equivalent arrangements as may be included within the spirit and scope of the invention as defined by the appended claims.

Figure 1:
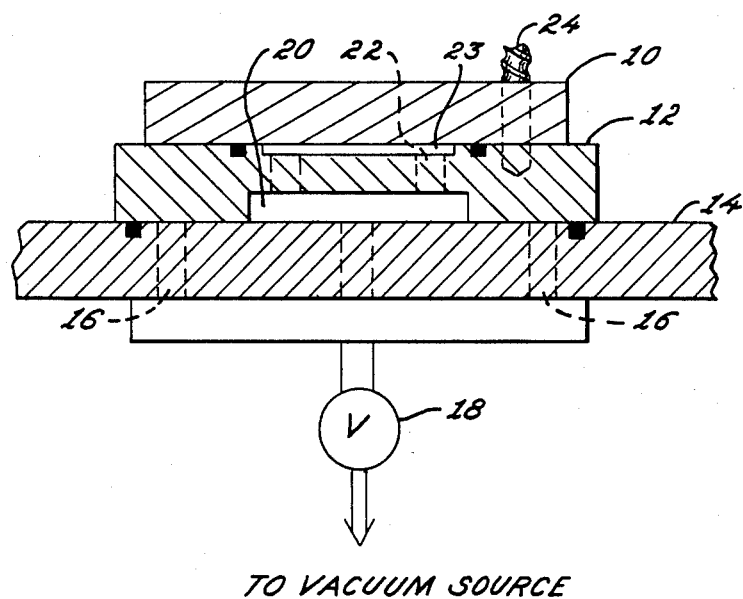
FIG. 1 is a sectional view of a prior art technique for the elevated chucking of workpieces by using spoilplates.
Figures 2, 3:
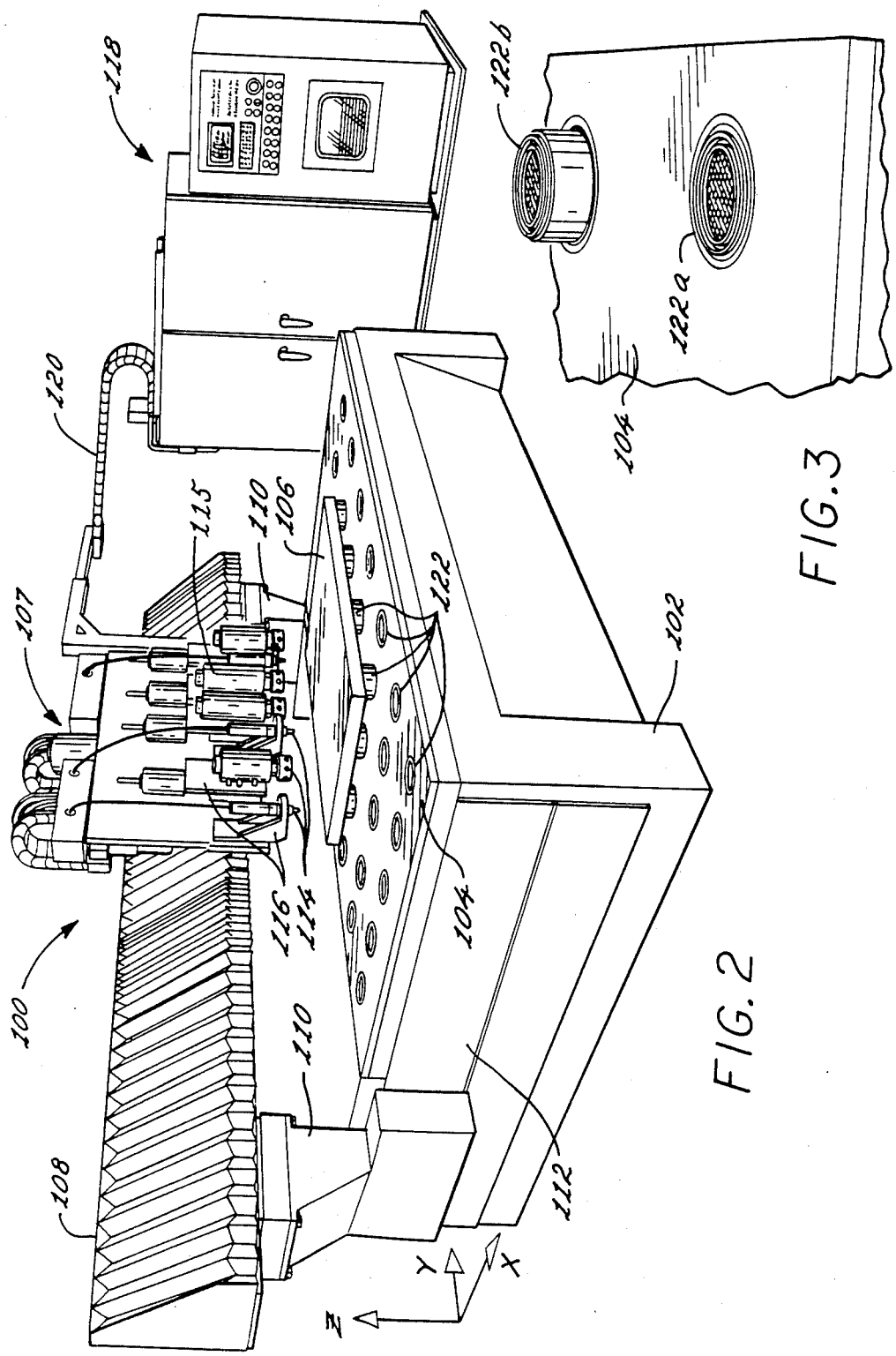
FIG. 2 is a perspective view of an exemplary milling-/routing/drilling machine embodying the vacuum chucking system of this invention.
FIG. 3 is an enlarged fragmentary perspective view of the work table of the machine shown in FIG. 2, showing pods in the activated and deactivated positions.

Referring now to FIG. 2, there is shown a perspective view of an exemplary milling/routing/drilling machine 100 using a vacuum pod workpiece chucking system constructed in accordance with the present invention. The machine 100 includes a machine bed 102 which serves as an integral foundation for supporting the various components and power drives comprising the overall machining system. The machine bed 102 carries a work table 104 which is adapted to rigidly support a workpiece 106 in order that it may be subjected to desired machining operations performed by a machining head, generally indicated at 107. The machining head 107 is mounted on guideways 108 which defines a slide permitting sideways movement of the machining device along the Y-axis relative to the machine work table. The Y-axis guideways 108 are carried on either end by machine uprights 110. The uprights are supported on guideways 112, which permit lateral movement of the uprights 110, and hence the guideways 108 and the machining head 107, along the X-axis relative to the machine work table.

The machining head 107 includes one or more cutting tools 114 and cutting tool drives 115, mounted on supports 116 which permit vertical displacement of the cutting tools along the Z-axis relative to the machine work table 104. The illustrated embodiment shows the use of four power driven router spindles and three driven drilling spindles, each independently controllable. The milling/routing/drilling machine described so far is fairly conventional and hence the constructional and operational details need not be discussed. It suffices to state that the machine permits machining of a workpiece, rigidly supported on the work table, by the controllable independent movement of the cutting tools along the three mutually perpendicular axes X, Y and Z (as shown in FIG. 2). The operation of the machine illustrated in FIG. 2 is typically controlled by a numerical control unit, generally indicated at 118, which is linked to the various machine components through a cable 120.

Focusing now upon the novel features of this invention, the machine 100 is provided with a plurality of vertically displaceable support pods 122 mounted in the work table 104 and lying in some preselected pattern here shown as a rectangular grid-like array. The pods 122 are normally disposed in a substantially flush-fit manner relative to the surface of the machine work table 104 and are selectively activatable to be raised upwardly to a predefined height in order to support a workpiece placed thereupon. This is illustrated clearly in the fragmentary perspective view of FIG. 3 which shows a pod 122a in its normal retracted position and another pod 122b in its extended position relative to the work table 104.

Figure 4:
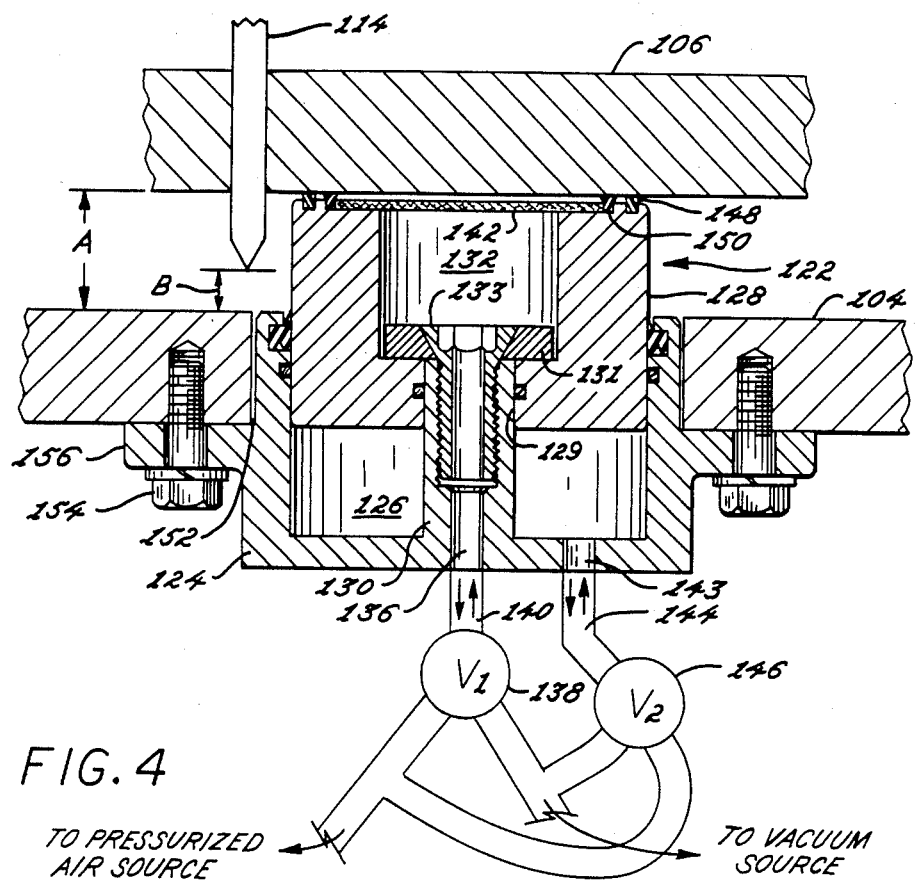
FIG. 4 is a cross-sectional view of a support pod for use with the illustrative embodiment of FIG. 2.
Figure 5:
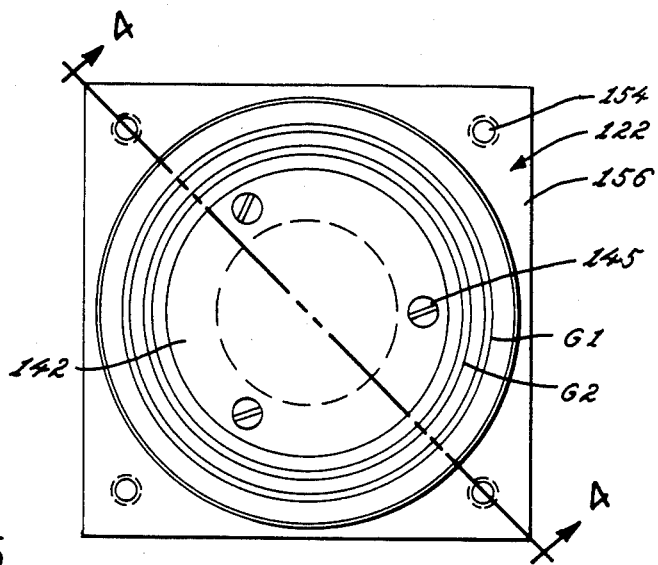
FIG. 5 is a top view of the support pod represented in FIG. 4.

The constructional details of the vacuum pods and their operation and programmable control capable of achieving the aforementioned objects of this invention will now be described. Referring in particular to FIG. 4, there is shown a cross-sectional view of an exemplary selectively activatable vacuum pod 122 for use with a workpiece chucking system according to the present invention. As shown, the pod 122 comprises a substantially cylindrical body 124 defining an annular cylindrical cavity 126 in which a piston 128 is slidably disposed. The cylindrical pod body 124 is formed with an internal upwardly projecting boss 130 which closely fits an aperture 129 in the piston 128. Stop means are provided at the end of the boss 130 for fixing the distance X by which the piston projects above the table when the pod is activated. In the illustrated embodiment, such stop means include a cylindrical washer 131 secured to the boss 130 and fixed in position by threaded fastener 133. Accordingly, when the piston is supplied with air pressure, the lower surface of the washer 131 sets a fixed stop for the piston 128 thereby to accurately establish the distance A that each piston projects above the surface of the work table. With a plurality of vacuum pods mounted in an array on the work table, the provision of a fixed stop 131 for the piston 128 is of significance. Normally all of the pods are configured exactly alike and mounted in the same fashion on the work table. Thus, when air is applied to any given pod, the position of its upper surface, as controlled by the stop 131, will be the same for each pod, in effect creating a plane raised above the work table which is perfectly parallel to the work table, so that the X, Y, Z axes of the machine tool with respect to the work table remain the same with respect to the raised workpiece.

Disposed within the piston 128 is a further cavity 132, conveniently cylindrical, which is open to the upper side of the piston. A channel 136 which projects through the threaded fastener 133 connects the internal passage 132, by way of the conduit 140 to activiator means shown as a valve 138 ($V_1$). As will be described below, the valve 138 in one condition couples a source of vacuum to the chamber 132 to hold the workpiece in place, and in its opposite condition provides a source of purge air for clearing away machining debris. For the purpose of preventing entry of foreign material, a porous screen or filter material 142 is secured by means of screws 145 across the opening of the piston cavity 132.

The cylindrical cavity 126 of the pod body 124 communicates through an integral passage 143 with a conduit 144 linking the cavity to activator means in the form of a valve 146. The valve 146 ($V_2$) is identical to the valve 138 and selectively connects the cylindrical cavity 126 either to the pressurized air source for activating the pod, or to the vacuum source for withdrawing it.

The upper surface of the piston 128 carries a first annular gasket 148 (G1) which is composed of a suitable hard rubber material and extends slightly above the upper surface of the piston to form a seat against which a workpiece 106 may rest when it comes into contact with the pod 122. A second annular gasket 150 (G2) of a diameter smaller than that of the gasket G1 is also disposed on the upper end of the piston and normally projects upwardly from the piston surface beyond the extension of the gasket G1. The gasket G2 is made of a relatively soft rubber material so that it forms a contact surface which is compressed by the workpiece 106 to form an airtight seal when the workpiece is placed upon the pod.

When a vacuum is applied to the cylindrical cavity 126 by the valve $V_2$ so as to connect the cavity to the vacuum source, the piston 128 will be retracted downwardly to a position in which it is substantially flush with the upper surface of the machine work table 104. This is the normal inactive position of a given pod. If the valve $V_2$ is switched to its alternate position, the cylindrical cavity of the pod is connected to the pressurized air source causing the piston 128 to be forced upwardly until the lower end of the cavity 132 abuts the washer 131 which, it is recalled, is secured to the upper end of the boss 130. This is the active position of the pod and in this position, the piston extends outwardly to a distance "A" above the upper surface of the machine work table. This provides a minimum clearance distance "B" between the work table 104 and a cutting tool 114 which projects completely through a workpiece 106, thereby precluding the possibility of any damaging contact between the tool and the work table.

When the valve $V_1$ is switched to couple the vacuum source to the piston cavity 132, the resulting vacuum created within the piston effectively locks the contact surface formed by the gasket G2 onto the undersurface of a workpiece placed upon the pod. On the other hand, when the valve $V_1$ connects the piston cavity 132 to the pressurized air source, air is forced through the longitudinally extending passage 136 into the piston cavity and serves to blow away any foreign particles, such as wood chips or dust, which may have accumulated on top of the filter material 142. This is referred to as "purging" of the filter material.

The pod 122 itself is rigidly anchored into position within a correspondingly sized cavity 152 formed through the machine work table 104 by means of screws 154. The pod has an integrally formed outwardly extending annular flange 156 defined on its external surface and the screws 154 pass through the flange 156 into the body of the machine work table 104.

It will be noted that although FIG. 4 shows the switching of the pressurized air and the vacuum to the piston cavity and the cylindrical cavity by activator means comprising separate valves $V_1$ and $V_2$, respectively activator means in the form of a single solenoid operated valve is used to perform this function according to one preferred aspect of the invention. Such a valve, the operation of which will be described below with reference to FIG. 7b, can conjunctively couple the cylindrical cavity of the pod and the piston cavity to either the pressurized air source or the vacuum source on the basis of the status (ON or OFF) of its solenoid.

According to an important feature of this invention, the action of the support pods is programmable so that the selective activation of the pods in order to support a workpiece can be performed on the basis of a predefined part program. This part program is exclusive to a given workpiece or series of identical workpieces and is based upon the designation of the exact region of the machine work table where a given workpiece is to be chucked into position for subsequent machining; the corresponding combination of support pods which the workpiece overlies when placed in the designated region is consequently a known factor. The part program defines a selected set of support pods which are to be activated and raised while each machining operation on the given workpiece is being carried out. The choice of the selected set of pods is made according to the actual pattern of machining motions and operations to which the workpiece will be subjected. More specifically, the selected pods are those defined by the part program which, when in an activated position, will not be in a location that offers any interference to the cutting tool as it goes through a necessary pattern of motion to perform the programmed machining on the workpiece.

Figure 6:
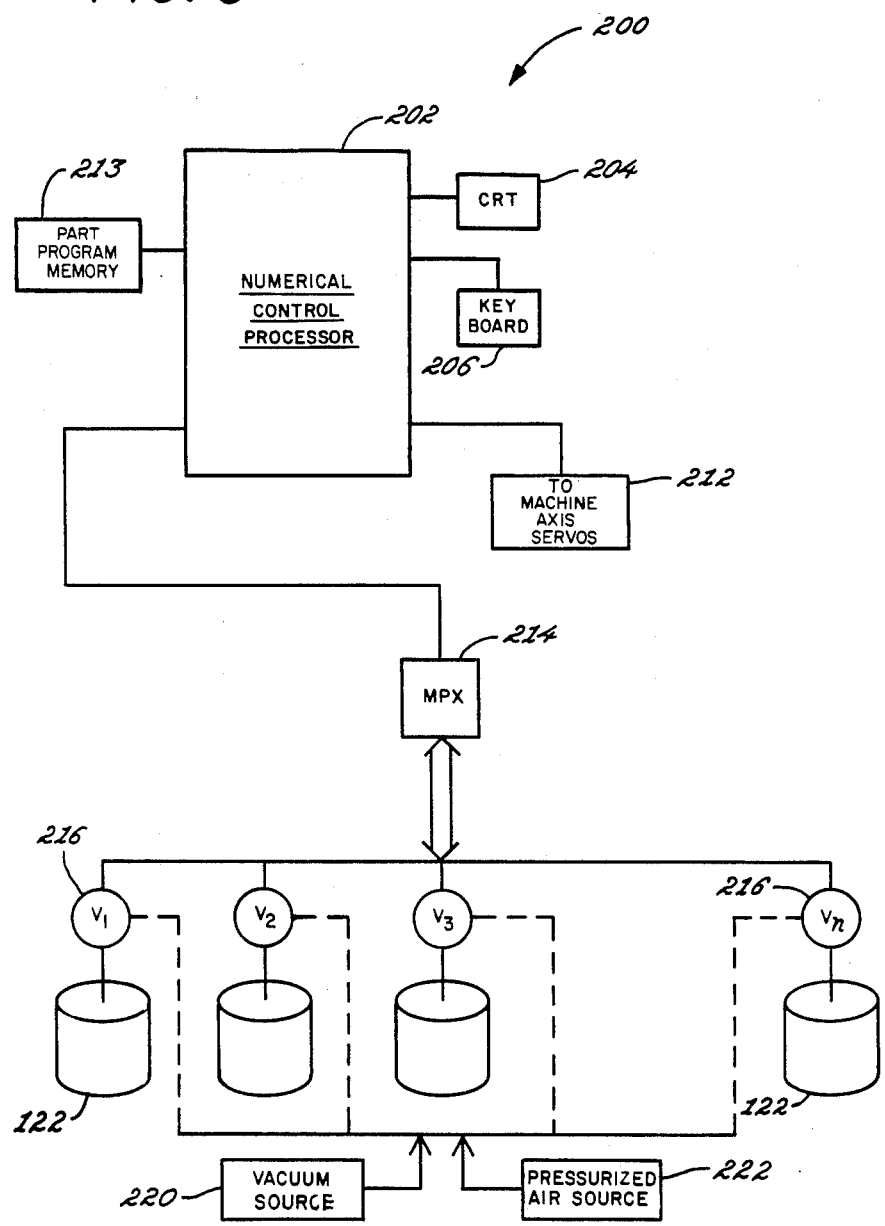
FIG. 6 is a simplified block diagram representation of an exemplary numerical control system for the illustrative embodiment of FIG. 2.

Referring now to FIG. 6, there is shown a simplified block diagram representation 200 of the overall control system using the numerical control unit to programmably regulate the operation of the illustrative workpiece chucking system. As shown, the system is controlled by a conventional numerical control unit which comprises a control processor 202, the internal configuration and processing action of which is well known in the art and is hence not described here.

A CRT 204 is dedicated for remote display of input, intermediate and output data, as well as other related information and communications. Part programs for the chucking system and related data may be manually input to the numerical control by a keyboard 206. The control processor sends the appropriate signals to the machine axis servos represented at 212 to control the actual cutting sequences and operations.

The control processor 202 acts upon part program data taken from any suitable memory 213 which functions basically to store the part programs for one or more different workpieces. Each part program may contain instructions for the sub-set of pods 122 which are to be activated when the corresponding workpiece is being treated. To route appropriate on-off signals to valve solenoids, a suitable multiplexer 214 is connected to valves 216 ($V_1, V_2, V_3 \ldots V_n$) respectively associated with the pods 122 disposed upon the machine work table. The numerical control regulates the action of the valves 216 in such a way that the vacuum source 220 and the pressurized air source 222 are connected to selected support pods 122 according to the part program fed to the numerical control at the start of a machining cycle. It will be obvious that, once a series of part programs corresponding to a series of different workpieces is prepared and stored within the numerical controller, the illustrative chucking system can be conveniently adapted to be used with the different workpieces by simply extracting the part program corresponding to a given workpiece from the numerical controller's memory and using that as a basis for controlling the action of the valves associated with the respective support pods.

Referring now to FIGS. 7a and 7b, there is shown a schematic diagram illustrating the connections to the various valves that control the action of the support pods. As shown in FIG. 7a, individual activator for the pods, in the form of valves 216 ($V_1, V_2 \ldots V_n$) are arranged together within one or more valve manifold assemblies 302. Each of the valves 216 is a conventional solenoid actuated valve configured in such a way that it accepts three input lines: (i) $E_V$ (vacuum) coming in from the vacuum source, (ii) $E_A$ (activating air) coming in from the pressurized air source and (iii) $E_P$ (purge air) also coming in from the pressurized air source. Depending on the status of the valve solenoid $S_P$, a given valve 216 connects selected ones of the three input lines to two output lines leading out to (i) the piston cavity 132 in the corresponding pod, and (ii) the cylindrical cavity 126 in the corresponding pod. More specifically, the valve connections are made in such a way that when the solenoid $S_P$ is switched off (and the connections represented in the left half of FIG. 7b are in effect), the pod is retracted and the pod filter is purged. In other words, when $S_P$ is OFF, the regulating valve connects the cylinder cavity 132 to the vacuum source line $E_V$ whereby the applied vacuum pulls the pod piston down to its normally retracted position. Also, the piston cavity is connected to the purge line $E_P$ so that a pulse of pressurized air is blown through the filter material to purge it.

When the solenoid $S_P$ is ON, the pod is extended outward to the limit established by washer 131, and the piston cavity 126 is subjected to a vacuum in order to draw the workpiece to the pod. In other words, when $S_P$ is ON (and the connections represented in the right half of FIG. 7b are in effect), the cylinder cavity is connected to the pressurized air line $E_A$ while the piston cavity 132 is connected to the vacuum source line $E_V$.

Further control over the action of the valves 216 and hence the operation of the support pod is provided by the inclusion of a pair of control valves between the valve manifold connections and the vacuum and pressurized air sources. More specifically, a pneumatic solenoid valve 304 whose action is controlled by the status of a solenoid $S_1$, connects the common purge line $E_P$ from the valve manifold 302 to the pressurized air source. A second pneumatic solenoid valve 306, whose action is controlled by the status of a solenoid $S_2$, connects the common vacuum line $E_V$ from the valve manifold to the vacuum source. The valve 306 is also connected to a vacuum gauge 308 providing a measure of the vacuum pressure applied by the vacuum source, and a master vacuum switch 310 for activating or deactivating the vacuum source. The common pressurized air line $E_A$ from the valve manifold is connected to the pressurized air source through an air regulator/gauge mechanism 312 which allows adjustment of air pressure and an indication of the air pressure.

The master valves 304 and 306 are controlled in combination in order to achieve desired operation of selected valves within the valve manifold and hence the corresponding support pods. Normally, when the machine tool is inactive, both valves 304 and 306 are off so that neither purge air nor vacuum are supplied to the vacuum pods by way of the valve manifold 302. The main pressure source, however, is not switched such that activation air is supplied to the valve manifold, but all the valves 216 are off so that all pods remain deactivated.

Prior to commencement of a machining cycle, but after the workpiece is accurately located on the work table, the vacuum valve 306 is switched on so that the vacuum source is applied to the valves 300 associated with all of the pods. A selected subset of the solenoids $S_p$ is activated which has two effects. The air supply $E_A$ to the selected pods is applied to the cylinders of the selected pods causing them to rise. At the same time, the vacuum source $E_V$ is applied to the internal cavities 132 of the selected pods, thereby drawing the workpiece thereto. Thus, the workpiece is firmly held in place and raised from the machine table so that machining operations can be performed. As described previously, individual ones of the valves 216 can be activated or deactivated during the course of machining to firmly support the workpiece, but to be retracted when the machining operation brings an active tool into the location occupied by that particular pod.

At the end of the machining cycle, the individual valves 216 can be deactivated which switches off the vacuum to each of the activated pods, switches off the activating air to each of the pods, and furthermore applies vacuum within the pod cylinder to retract the pod. The workpiece can then be removed. With the workpiece removed, the valve 304 can be momentarily activated to blow a pulse of purge air through the filters, thus clearing the pods in preparation for receipt of the next workpiece.

As an alternative, the pods need not be withdrawn to remove the workpiece. It is simply necessary to deactivate the valve 306 which removes the vacuum source from within the pods so that the workpiece can be removed. In that mode of operation, the valve 304 can also be momentarily activated to purge the pods before the next workpiece is positioned for machining.

The activation of a certain set of solenoids $S_p$ is defined, for a given workpiece or a series of workpieces, by the specially written part program which clearly specifies which particular subset of valves has to be activated at any given time during the machining of a particular workpiece. As discussed above, the subset of support pods specified in a part program are selected on the basis of the desired pattern of machining operations to be performed on a particular workpiece and represent those pods which in combination are capable of adequately supporting the workpiece while it is being machined without interfering with the cutting tool as it traces the path required to machine the workpiece. The part program defines the operation of the valves under the assumption that the pressurized air source and the vacuum source are continuously connected to the valves. As a given workpiece is being chucked for machining on the basis of a particular part program, the master valves 304, 306 provide a means of additional control over the support pod action by controlling the actual connection of the air and vacuum sources to the valve manifold assembly. It will however be understood that the master valves are not essential to the operation of the illustrative chucking system which can operate efficiently just by the programmed operation of the valves on the basis of the predefined part program.

Figure 8:
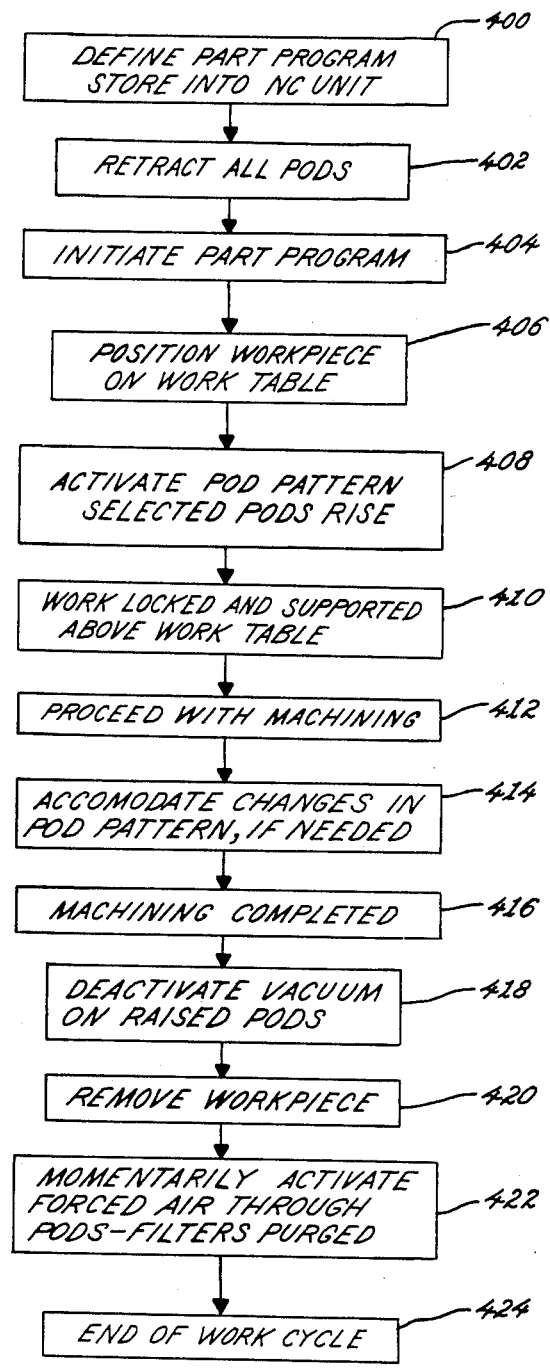
FIG. 8 is simplified flow chart representation of the basic sequence of operations undergone by the illustrative programmable vacuum pod system.

Referring now to FIG. 8, there is shown a simplified flow chart illustrating one sequence of operations undergone by the programmable vacuum pod system of this invention in the chucking of workpieces. The initial step 400 involves the definition of a part program for the particular workpiece that is to be machined. This program is then either keyed into the numerical controller unit of the machining system or transferred to the NC unit through its disk drive. At the subsequent step 402, all support pods are retracted to their normal flush-fit position relative to the work table by the application of a vacuum to the cylindrical cavity of the pod.

At step 404, the NC unit initiates the part program stored within it. At step 406, the machinist positions the workpiece on the work table. Conveniently, stops are positioned on the work table for accurate location of the workpiece. With the workpiece in position, the NC unit activates the subset of support pods specified by the part program at a step 408. As shown at step 410, the work is thereupon locked in position and supported above the work table so that step 412 can be accomplished to machine the part. As illustrated by step 414, pods can be raised or lowered as needed as the machining proceeds. Upon completion of the machining at step 416, the pods are deactivated at step 418 by releasing the activating air, removing the vacuum from the hold down cylinders and applying vacuum to the internal cylinders to withdrawn the pods. The workpiece is removed at step 420 following which purge air is momentarily activated at step 422 to clear the machine table for positioning of a new part. Step 424 illustrates that the work cycle has thereupon been completed.

It will be noted that the above sequence of operation has been described only by way of illustration and not by way of limitation. The sequence of operations involved in the chucking of workpieces may be changed to suit particular machining operations. For instance, particularly in the case of simple machining operations, the pods may be left in the activated position while the workpiece is changed. In that situation, the selected subset of pods is activated continuously by way of the valves 300. After the workpiece is positioned, the vacuum valve 306 is energized so that all of the activated pods receive vacuum in the hold down chamber to hold the workpiece in place. After machining is accomplished, the vacuum valve 306 is deactivated to release the workpiece although the individual pod valves 300 remain activated and thus remain in the raised position. Purge air can be supplied as needed.

It will also be noted that the illustrative workpiece chucking system is not restricted for use with workpieces having completely flat undersurfaces. The system can function efficiently as long as the undersurface of the workpiece has a plurality of well-defined flat areas with which a particular set of support pods selected by an appropriate part program may make contact in order to adequately support the workpiece in an elevated manner.

From the foregoing it is apparent that the programmable vacuum support pod workpiece chucking system of this invention provides a higher flexible system for supporting any given one of a plurality of workpieces, having of different shapes and contours, in a manner that permits interference-free machining—and without the need for any special fixtures such as spoil-plates.

I claim as my invention:

1. Apparatus for supporting and vacuum chucking a workpiece above a work table of a machine tool to produce a clearance between the work table and a cutting tool projecting through the workpiece during machining, said apparatus comprising in combination:
   a spaced array of vacuum pods supported by the work table, said vacuum pods having a support surface adapted to be positioned in an inactive position substantially flush with the work table and an active position disposed above the work table;
   separate activator means for the vacuum pods;
   means associated with the activator means for raising a selected subset of said vacuum pods to the active position while leaving the remaining vacuum pods in the inactive position to firmly support the workpiece while leaving clearance at locations through which the cutting tool is intended to pass; and
   the activator means including means for concurrently supplying vacuum to only the vacuum pods in the active position thereby to firmly grip the workpiece in its raised supported position.

2. The apparatus of claim 1 wherein each vacuum pod includes two separate pneumatic chambers, a first of said chambers comprising a piston within a cylinder adapted to be raised to the active position when supplied with air pressure by its associated activator means and withdrawn to the inactive position in the absence of such supply, the second chamber being associated with the support surface and adapted to be supplied with vacuum by its associated activator means to draw the workpiece to the vacuum pod.

3. The apparatus of claim 2 wherein the cylinder and piston include stop means for accurately establishing the position of the support surface when the pod is in the active position, thereby to create by means of the plurality of said pods a surface for support of the workpiece which is parallel to the work surface.

4. The apparatus of claim 2 including filtering means separating said support surface from the second chamber to prevent entry of machining debris, and wherein the system includes purge means for supplying purge air to the second chamber to clear debris from the area of the vacuum pod.

5. The apparatus of claim 2 wherein each separate activator means comprises a single solenoid valve, each said valve having an active position in which vacuum is supplied to the second chamber and pressurized air is supplied to the first chamber for raising said pod to the active position.

6. The apparatus of claim 5 wherein each solenoid valve has an inactive position in which purge air is temporarily supplied to the second chamber for clearance of machining debris, and vacuum is applied to said first chamber for positively withdrawing the pod to the inactive position.

7. The apparatus of claim 2 wherein the action of the vacuum pods is programmable, so that the selective activation of the pods in order to support a workpiece is performed on the basis of a predefined program.

8. The apparatus of claim 7 further including programmable means for controlling the selective activation of said vacuum pods on the basis of a predefined program.

9. The apparatus of claim 8 wherein said programmable means is a numerical controller and said predefined program includes a designation of the selected subset of vacuum pods which, when in an activated position, are capable of supporting a given workpiece without interfering with the cutting tool as the workpiece is machined.

* * * * *